United States Patent [19]

Bocchi et al.

[11] Patent Number: 4,590,511

[45] Date of Patent: May 20, 1986

[54] CIRCUIT FOR CONVERTING THE PHASE ENCODED HUE INFORMATION OF A QUADRATURE MODULATED COLOR SUBCARRIER INTO DISTINCT ANALOG VOLTAGE LEVELS

[75] Inventors: Curtis J. Bocchi, St. Paul; Donald A. Eide, Maple Grove; Rebecca A. Hart, New Hope, all of Minn.

[73] Assignee: Honeywell Inc., Minneapolis, Minn.

[21] Appl. No.: 567,710

[22] Filed: Jan. 3, 1984

[51] Int. Cl.$^4$ .................... H04N 9/64; H04N 9/74
[52] U.S. Cl. .................... 358/21 R; 358/10; 358/82; 358/93; 358/101; 356/402
[58] Field of Search .................... 358/10, 22, 81, 82, 358/11, 101, 106, 93, 21 R; 356/402, 405, 406

[56] References Cited

U.S. PATENT DOCUMENTS

| | | | |
|---|---|---|---|
| 3,614,304 | 10/1971 | Schonfelder | 358/10 |
| 3,710,011 | 1/1973 | Altemus et al. | 358/82 |
| 4,470,064 | 9/1984 | Michener | 358/10 |
| 4,481,529 | 11/1984 | Kevling | 358/82 |
| 4,547,897 | 10/1985 | Peterson | 358/101 |

Primary Examiner—John W. Shepperd
Attorney, Agent, or Firm—George W. Field; Roger W. Jensen

[57] ABSTRACT

In combination: apparatus isolating the chroma information from a quadrature modulated color subcarrier video signal; and apparatus transforming said chroma information into an analog voltage having distinguishable levels uniquely representative of distinguishable hues of the composite signal.

7 Claims, 5 Drawing Figures

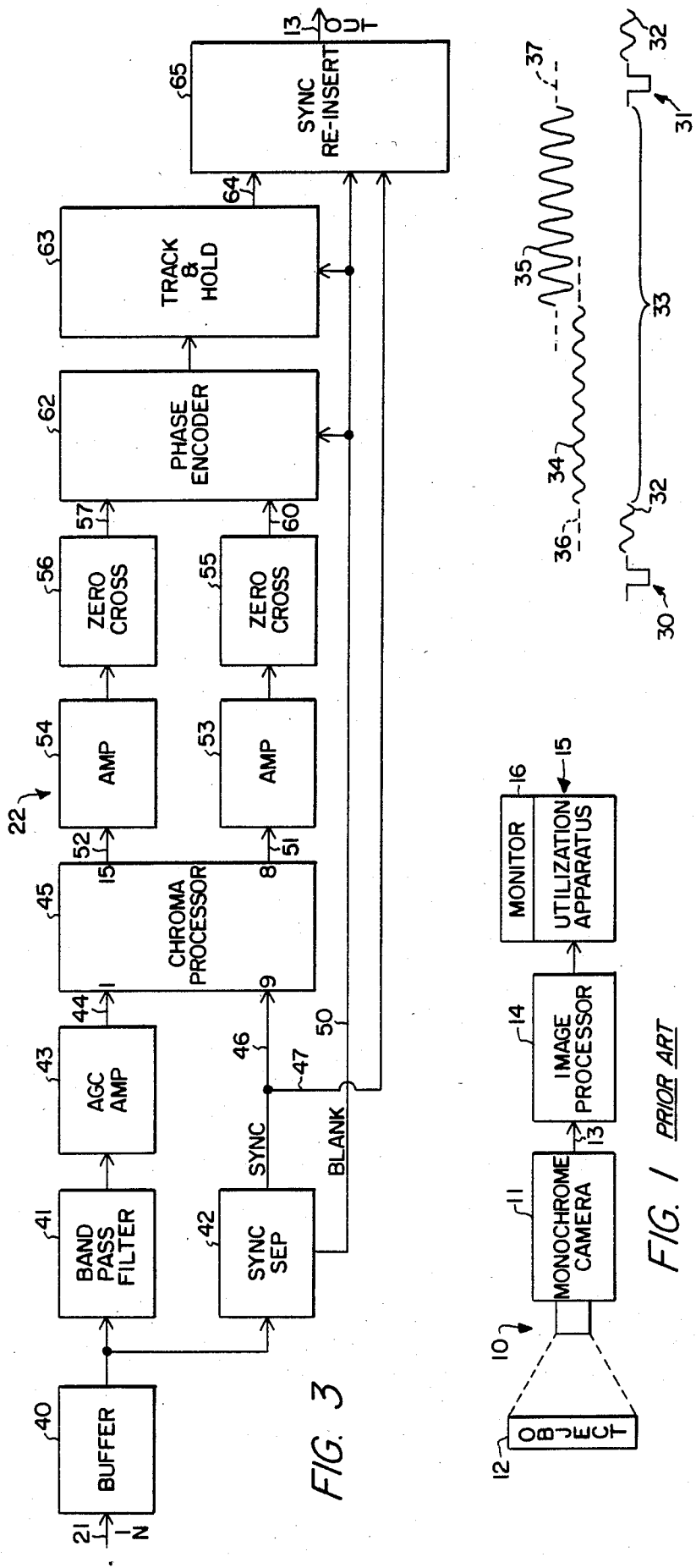

CIRCUIT FOR CONVERTING THE PHASE ENCODED HUE INFORMATION OF A QUADRATURE MODULATED COLOR SUBCARRIER INTO DISTINCT ANALOG VOLTAGE LEVELS

FIELD OF THE INVENTION

This invention relates to the field of industrial inspection of scenes such as manufactured objects, as for example, to determine the presence or absence of parts, their identification, and their position or orientation all automatically, where color is a factor in the inspection process.

Prior art inspection apparatus has, for the most part, involved the use of a monochrome television camera which observes the object and operates to produce a video output signal representing an image of the object. The signal is presented to an image processor which assigns a binary or "grey scale" digital value to each pixel of the image in accordance with the luminance at that pixel. The digital representation may then be compared with a standard image in memory (template matching) or, in more advanced systems, may be used by a programmed computer in the image processor to compute the area, perimeter, coordinates, orientation, and so forth of the parts. The output of the image processor may be a display for use by a human operator, or may be a command to a machine or robot device for selecting, rejecting, or positioning the object.

The parts of the object are recognized by the contrast between them and surrounding elements or background. A difticulty arises when the parts differ from the background only by color, and cannot be distinguished when presented in black and white. As an example, the color coding on a resistor identifies its value, and yet the resistor may be of the same size and shape as a resistor of different value, and "grey scale" analysis of color coding bands is not a reliable code indicator. Likewise, a capacitor may have exactly the same size and shape as a resistor, but be of a difterent color, and the identification of that capacitor depends upon the identification of the color involved. Also, a capacitor may be of a very similar luminance as an underlying circuit board, and cannot be distinguished therefrom in a grey scale presentation even though the board is green and the capacitor is red.

Prior art systems have tried to handle this problem by utilizing a color television camera, then processing the individual red, green, and blue signals provided thereby with three separate image processing devices to assign digital values for each of the color components, and thereafter combining the results and comparing them to determine the color as well as the other features of the part being observed. Unfortunately, such systems are quite costly in that they involve three separate imaging processing paths, and they take considerably more time in operation than is preferred.

SUMMARY OF THE INVENTION

It will be remembered that the "color" of an object has three characteristics, namely hue, saturation, and luminance: hue and saturation together are referred to as the chroma or chrominance of the object. The output of a monochrome television camera contains only the luminance component, and as has been mentioned, adjacent elements in an object of different colors may yet have the same luminance or brightness, and thus be indistinguishable—the same shade of grey—in a monochrome presentation. We have discovered that it is possible to derive from the hue components of different colors a grey scale in which all the colors are mutually distinguishable, even if of the same luminance.

The present invention comprises an inspection system which derives from the single, composite output signal of a color television camera a signal which is interpretable by grey scale image processing equipment as identifying not only the presence and location of parts of an object, but of their color as well, so that objects having the same luminance but of different hues can readily be distinguished.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawings, in which like reference numerals identify corresponding parts in the several views, FIG. 1 is a block diagram illustrative of prior art structure, FIG. 2 is a block diagram of a system embodying the invention, FIG. 3 a more detailed block diagram of a color converter comprising the invention, FIG. 4 is an illustrative wave form diagram.

DETAILED DESCRIPTION OF THE PREFERRED EMBODIMENT

Figure 5:
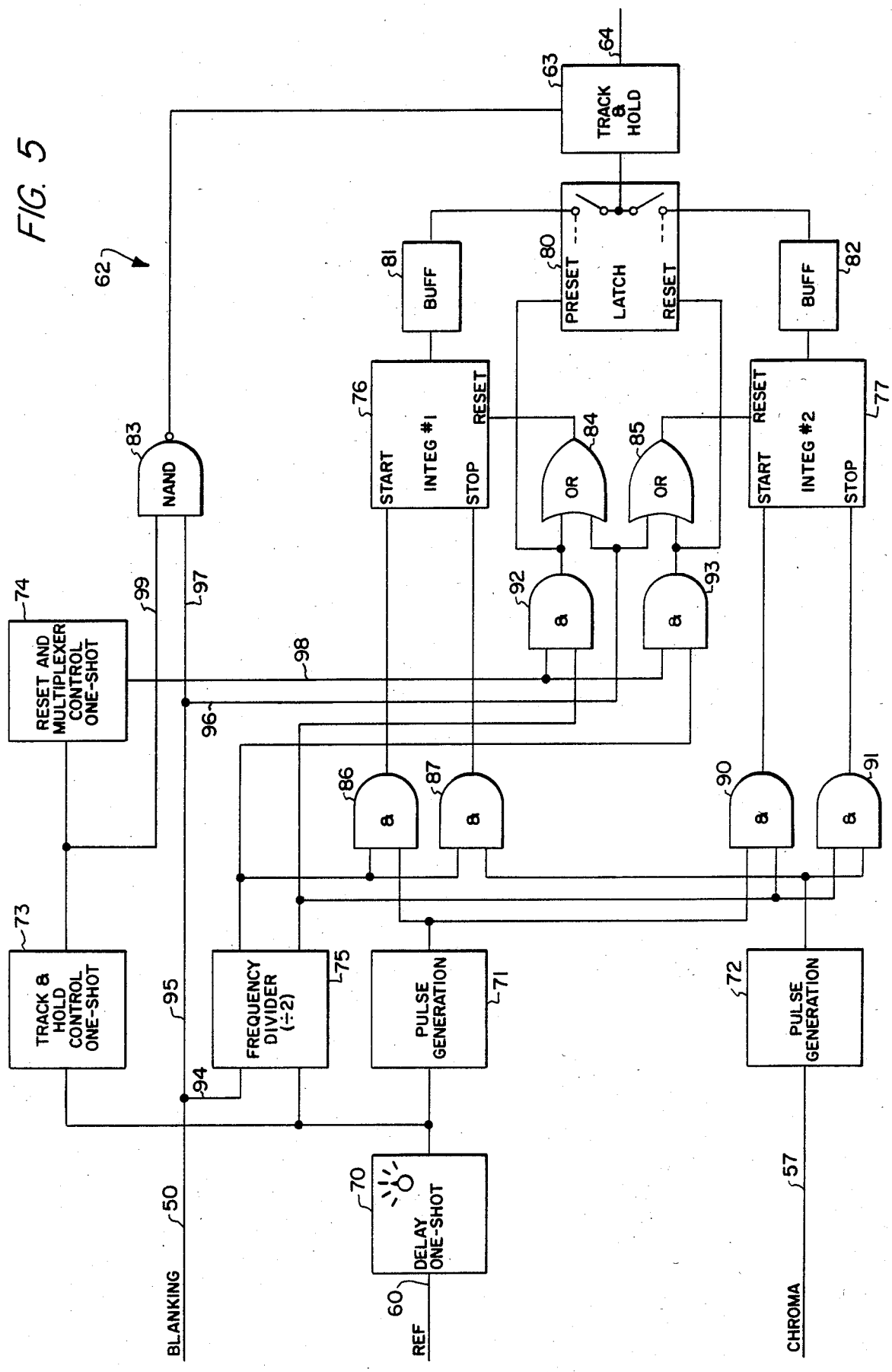
FIG. 5 is a block diagram giving more details of a phase encoder of FIG. 3.

Referring first to FIG. 1, a system 10 according to the prior art is shown to comprise a monochrome television camera 11 which observes an object 12 and supplies a black and white signal 13 to an image processor 14, which performs a grey scale digitizing of the image and supplies its output to a utilization device 15, which may include a monitor 16, or a memory recording of the intended signal for a properly structured and positioned object, together with any control equipment desired to be operated. Image processors, in general, are adapted to receive a particular type of signal, as that identified by the EIA standard RS 170, for example, and output 13 therefore customarily takes this form.

FIG. 2 shows a system 19 according to the present invention, in which members 13, 14, 15, and 16 are as before. Here, object 12 is being observed by a color television camera 20 which supplies a signal 21 which is not usable with processor 14 for the purpose of extracting the desired color information: a color converter 22 is therefore interposed between camera 20 and processor 14 to derive from camera signal 21 a modified color encoded signal 13 appropriate to processor 14, as will be described in detail in connection with FIG. 3.

Attention is first directed to FIG. 4, however. This figure illustrates a portion of output 21 corresponding to one horizontal sweep across the image of object 12, which, for simplicity, is assumed to be of only two different colors.

Here reference numerals 30 and 31 identiiy two successive horizontal sync pulses, which are of standard configuration as accepted by processor 14, except that each has on its "back porch" a color burst 32 of subcarrier frequency. The picture signal 33 represents the object in its two colors, which appear as portions 34 and 35 respectively. These are components of the same frequency as subcarrier burst 32, but are at phase angles with respect thereto determined by the hues of the two colors: they are sinusoidal about levels 36 and 37 which are representative of the luminances of the colors, and their amplitudes about levels 36 and 37 are representative of the saturations of the colors. For example, a phase angle of 0° might represent the hue red, while a phase angle of 180° might represent the complimentary hue, cyan.

Color converter 22 functions to derive from signal 33 an analog voltage representative of the phase relation between color subcarrier established by burst 32 and portions 34, 35, and so forth of the composite signal, uninfluenced by the levels 36 and 37 or the amplitudes of portions 34 and 35 about those levels, and to supply this analog voltage to processor 14 in an appropriate form for digitizing in the processor. This is accomplished as will now be described, referring to FIG. 3.

In converter 22, the composite signal 21 is fed to a buffer amplifier 40 and thence to a band pass filter 41 and a sync separator 42. Filter 41 passes a frequency range including the frequency of burst 32 and signal portions 34 and 35, but does not pass the repetition frequency of sync pulses 30, 31, and so forth, nor that at luminance levels 36 and 37. The filter output is fed through an automatic gain control amplifier 43 to provide the chroma input 44 for a chroma processor 45.

Sync separator 42 extracts from the composite signal the horizontal sync pulses, supplying them at 46 and 47. It also supplies blanking pulses at 50 for suppressing the signal processing during scanner retrace.

Processor 45 is a commercially available item, identifiable by the R.C.A. number CA3126Q. It contains a local generator which is phase locked to control burst 32 to supply a first, reference output at 51, and it also supplies at 52 a chroma output containing the high frequency components of signal pulses 34 and 35, retaining their phase relation with the regenerated subcarrier 51.

Outputs 51 and 52 are fed through amplifiers 53 and 54 to zero crossing detectors 55 and 56, to supply chroma and reference signals 57 and 60, which are fed to a phase encoder 62 which cooperates with a track-andhold device 63 to supply an output 64 which is a greyscale analog of the hue components of the composite signal at 21. The synch and blanking signals are added to output 64 at 65, to give a composite signal 13 which is acceptable to equipment designed for RS170 signals.

In general terms, start and stop signals are created which are spaced in time by the phase angle between signal components 51 and 52 for successive cycles of the subcarrier frequency. The start and stop signals control the operation of integrating means which supplies an output voltage determined by the length of the integrating interval. That voltage is held until a new integration is completed, so that a signal is produced which comprises a train of step voltages which is smoothed to become an analog voltage. To allow time for integrator resetting, a pair of integrators are used alternatively for successive cycles of the subcarrier, and an analog multiplexer is used to alternately select the integrators and present their signals to the track-andhold device.

Phase encoder 62 is shown in FIG. 5 to comprise a delay generator 70, a plurality of pulse generators 71, 72, 73, and 74, a frequency divider 75, first and second integrators 76 and 77, a multiplexer 80, buffer amplifiers 81 and 82, a logical NAND 83, logical OR'S 84 and 85, and logical AND'S 86, 87, 90, 91, 92, and 93. Frequency divider 75, multiplexer 80, and the logical AND'S and OR'S function to cause operation of the integrators alternately on successive cycles of the subcarrier. Each cycle of integrator operation starts with a signal from pulse generator 71 and stops with a signal from generator 72: the voltage reached by the integrator is fed through multiplexer 80 and held in device 63. During this interval, the other integrator is being reset. For the next subcarrier cycle, the integration operation reverses, the second integrator being in operation and the first being reset. During the blanking period reset of the integrators and operation of track-and-hold device 63 are controlled by blanking signal 50 through leads 94, 95, 96, and 97. Reset of the integrators and operation of the multiplexer are controlled by a reset signal 98 from pulse generator 74. Track-and-hold operation is controlled by a track-and-hold signal 99 from pulse generator 73. Generators 73 and 74 may conveniently be one-shots, and generators 71 and 72 and frequency divider 75 may be flip-flops.

OPERATION OF THE INVENTION

The operation of the color converter will now be detailed. At the time of each horizontal synch pulse, a reference signal generator in chroma processor 45 is synchronized with the color burst 32 of the composite signal, and the output of that generator is supplied through amplifier 53 and zero crossing circuit 55 to delay generator 70 and pulse generator 71 of FIG. 5. Similarly, the chroma component of the composite signal is supplied by chroma processor 45 through amplifier 54 and zero crossing circuit 56, to pulse generator 72. For a first cycle of the subcarrier, frequency divider 75 acts through AND circuits 86, 87, 90, and 91 to select one of integrators 76 and 77 to receive a start signal from generator 71, and a stop signal from generator 72, determined in time by the zero crossings of the subcarrier and chroma signals, and hence by the phase angle between portion 34 of the composite signal and the regenerated carrier which has been phased locked to the color burst 32. The selected integrator operates for the interval between start and stop signals to produce a direct voltage proportional in magnitude to the duration of the interval. Frequency divider 75 also acts through AND circuits 92 and 93, in cooperation with pulse generator 74, to supply the output of the selected integrator to track-and-hold device 63 through multiplexer 80, and also act through OR circuits 84 and 85 to cause reset of the integrator which was not selected. The system is now ready to repeat the sequence with the next cycle of the subcarrier, this time selecting the other integrator, and resetting the one previously selected, and so on repeatedly.

As long as the chroma component of the composite signal remains the same for successive subcarrier periods, so that the phase angle being measured does not change, the output of the multiplexer remains constant, first from one integrator and then from the other. If the chroma component changes, so do the integrator outputs.

The next succeeding blanking pulse acts through NAND circuit 83 in cooperation with one-shot 73 to disable track-and-hold device 63, and through OR circuits 84 and 85 to reset both integrators, so as to prevent undesirable response to transients during the return sweep.

Delay one-shot 70 functions to introduce a variable calibration delay, so that a predetermined integrator output level may be made to correspond with a predetermined hue component in the composite signal.

From the above it will be evident that the invention comprises means for deriving from the composite signal of a color camera an output which distinguishably represents in monochrome all the hue components of the original signal.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

We claim:

1. In combination:
means isolating the chroma information from composite video color signal having a quadrature modulated color subcarrier;
and means transforming the phase encoded hue information of the quadrature modulated subcarrier into unique analog voltages.

2. In combination:
means isolating the chroma information from a quadrature modulated color subcarrier video signal;
means connected to receive said color information and supplying a pair of alternating voltage outputs comprising a reference voltage and a signal voltage having distinguishable levels uniquely representative of distinguishable hues of the video signal;
first and second zero crossing circuit connected to said alternating voltages respectively;
integrating means;
means connecting said first zero crossing circuit to start operation of said integrating means;
and means connecting said second zero crossing circuit to stop operation of said integrating means,
so that the result of said operation of said integrating means is a direct voltage proportional to the interval between zero crossings of said alternating voltages and henc eproportional to the desired phase angle.

3. Apparatus according to claim 2 in which said integrating means comprises first and second integrators, together with means alternately connecting said zero crossing circuits to one of said integrators and concurrently resetting the other of said integrators.

4. Apparatus according to claim 3 further including means resetting said integrators.

5. Apparatus according to claim 3 and track-and-hold means connected to said integrating means to receive and hold the integrator outputs.

6. Apparatus according to claim 5 and means resetting said integrating means before a succeeding cycle of said first alternating voltage begins.

7. In combination:
means separating the synch and blanking signals of a composite video color signal having a quadrature modulated color subcarrier video signal for the chroma information thereof;
means transforming the phase encoded hue information of the quadrature modulated subcarrier into unique analog voltages;
and means combining said synch and blanking signals with said analog voltages to provide an output.

* * * * *